US011686222B2

(12) United States Patent
Hu

(10) Patent No.: US 11,686,222 B2
(45) Date of Patent: Jun. 27, 2023

(54) AIRCRAFT ENGINE WITH HYDROGEN FUEL SYSTEM

(71) Applicant: PRATT & WHITNEY CANADA CORP., Longueuil (CA)

(72) Inventor: Tin-Cheung John Hu, Markham (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/386,933

(22) Filed: Jul. 28, 2021

(65) Prior Publication Data

US 2023/0035231 A1   Feb. 2, 2023

(51) Int. Cl.
  *F01D 25/32* (2006.01)
  *B01D 53/26* (2006.01)
  *B01D 5/00* (2006.01)
  *F02C 3/22* (2006.01)

(52) U.S. Cl.
  CPC .......... *F01D 25/32* (2013.01); *B01D 5/0003* (2013.01); *B01D 5/0075* (2013.01); *B01D 53/265* (2013.01); *F02C 3/22* (2013.01); *F05D 2220/323* (2013.01)

(58) Field of Classification Search
  CPC .... F01D 25/32; F02C 3/20; F02C 3/22; F02C 3/30; F02C 3/305; F02C 6/00; F02C 6/10; B01D 5/0003; B01D 5/0075; B01D 53/265; F05D 2220/323
  See application file for complete search history.

(56) References Cited

U.S. PATENT DOCUMENTS

| | | | | |
|---|---|---|---|---|
| 5,331,806 A | * | 7/1994 | Warkentin | F02C 3/305 60/39.52 |
| 6,379,829 B1 | * | 4/2002 | Kurita | H01M 8/04089 429/441 |
| 6,641,084 B1 | | 11/2003 | Huber et al. | |
| 6,834,831 B2 | | 12/2004 | Daggett | |
| 7,550,218 B2 | * | 6/2009 | Hoffjann | F02C 6/00 60/648 |
| 2005/0266287 A1 | * | 12/2005 | Hoffjann | B64D 11/02 429/513 |

(Continued)

FOREIGN PATENT DOCUMENTS

| | | |
|---|---|---|
| EP | 0634563 | 1/1995 |
| EP | 0900921 A2 | 3/1999 |
| WO | 97031184 A1 | 8/1997 |

OTHER PUBLICATIONS

European Search Report issued in counterpart application 22186782.3 filed Jan. 13, 2023.

*Primary Examiner* — Loren C Edwards
(74) *Attorney, Agent, or Firm* — Norton Rose Fulbright Canada LLP

(57) ABSTRACT

An aircraft engine has a combustor supplied by a hydrogen fuel system and is configured to combust hydrogen and generate water vapor. A water vapor collector receives at least part of the water vapor. A condenser is in fluid communication with the water vapor collector to receive and cool in the condenser the at least part of the water vapor and thereby condense at least part of the at least part of the flow of water vapor. A spray nozzle is in fluid communication with the condenser and operable to spray the condensed part of the at least part of the flow of water vapor onto a component of the aircraft engine.

17 Claims, 1 Drawing Sheet

(56) References Cited

U.S. PATENT DOCUMENTS

2010/0115960 A1     5/2010   Brautsch et al.
2011/0011096 A1*   1/2011   Edwards ................ F02C 7/141
                                                              429/492

* cited by examiner

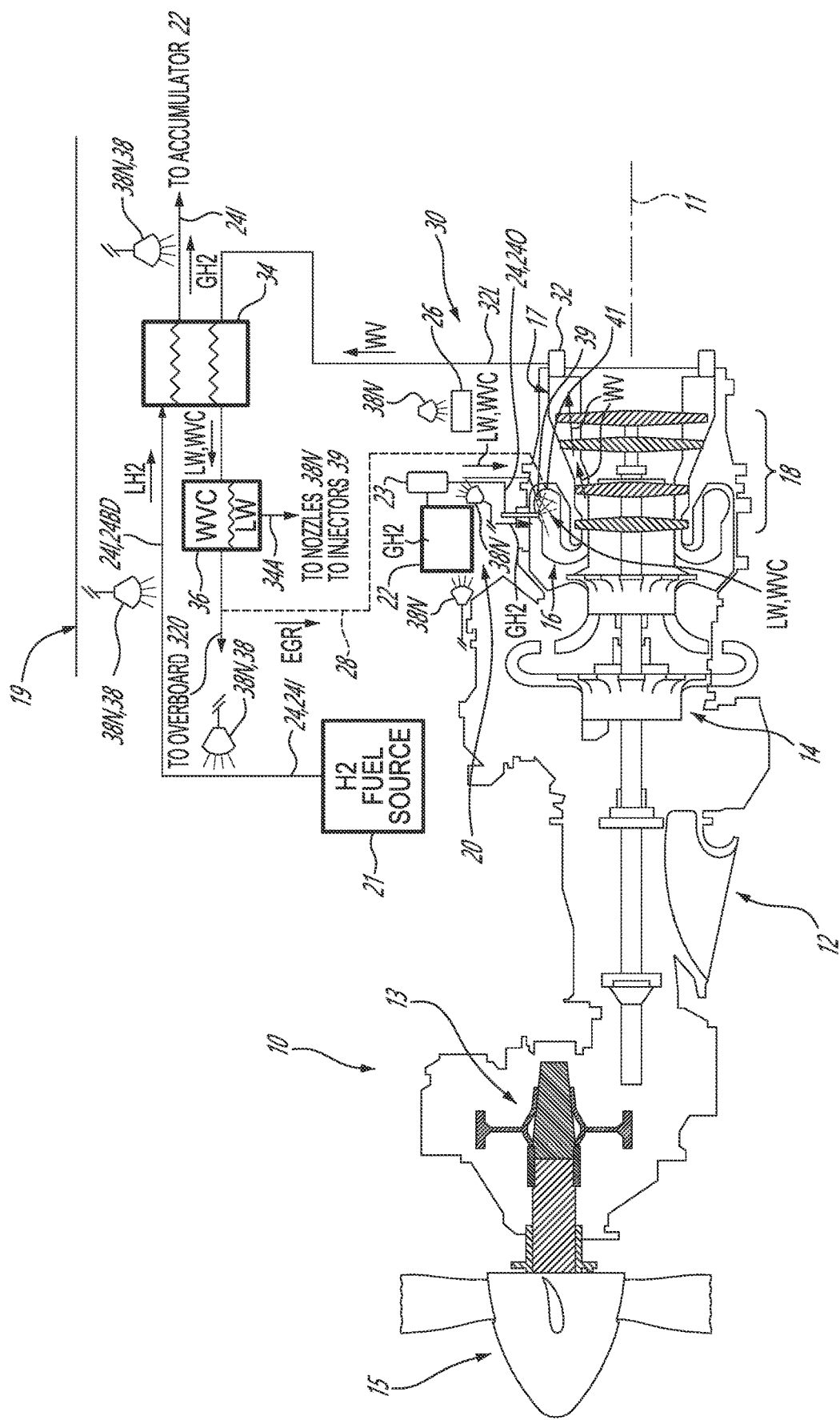

AIRCRAFT ENGINE WITH HYDROGEN FUEL SYSTEM

TECHNICAL FIELD

The application relates generally to aircraft engines and, more particularly, to fuel systems for aircraft engines.

BACKGROUND

There is interest in using hydrogen (H2) as a fuel in aircraft engines. One of the issues with hydrogen is its explosiveness, and for this reason, there remain challenges to using hydrogen as a fuel source in aircraft engines.

SUMMARY

There is disclosed an aircraft engine, comprising: a hydrogen fuel system including an accumulator of hydrogen, and one or more fuel lines in fluid communication with the accumulator and configured to carry the hydrogen; a combustor in fluid communication with the one or more fuel lines to receive the hydrogen from the accumulator, the combustor operable to combust the hydrogen and produce a flow of water vapor; a turbine section downstream of the combustor for extracting energy from the flow of water vapor; a water vapor collector positioned downstream of the turbine section to receive at least part of the flow of water vapor when the aircraft engine is operating; a condenser in fluid communication with the water vapor collector, the condenser operable to receive and cool in the condenser the at least part of the flow of water vapor and thereby condense at least part of the at least part of the flow of water vapor; and a spray nozzle in fluid communication with the condenser and operable to spray the condensed part of the at least part of the flow of water vapor onto a component of the aircraft engine.

There is disclosed a water recovery system for an aircraft engine having a combustor supplied by a hydrogen fuel system and configured to combust hydrogen and generate water vapor, the water recovery system comprising: a water vapor collector for receiving at least part of the water vapor; a condenser in fluid communication with the water vapor collector, the condenser operable to receive and cool in the condenser the at least part of the water vapor and thereby condense at least part of the at least part of the flow of water vapor; and a spray nozzle in fluid communication with the condenser and operable to spray the condensed part of the at least part of the flow of water vapor onto a component of the aircraft engine.

There is disclosed an aircraft engine, comprising: a hydrogen fuel system including an accumulator of hydrogen, and one or more fuel lines in fluid communication with the accumulator and configured to carry the hydrogen; a combustor in fluid communication with the one or more fuel lines to receive the hydrogen from the accumulator, the combustor operable to combust the hydrogen and generate a flow of water vapor; a water vapor collector positioned downstream of the turbine section to receive at least part of the flow of water vapor when the aircraft engine is operating; and a condenser in fluid communication with an outlet of the water vapor collector, the condenser operable to receive and cool in the condenser the at least part of the flow of water vapor and thereby condense at least part of the at least part of the flow of water vapor; and one or more of the following: a spray nozzle in fluid communication with an outlet of the condenser and operable to spray the condensed part of the at least part of the flow of water vapor onto a component of the aircraft engine; the condenser in fluid communication with the one or more fuel lines to receive liquid hydrogen from a hydrogen fuel source, and to convert the liquid hydrogen to gaseous hydrogen with heat released from condensation of the condensed part of the at least part of the flow of water vapor; and water injectors in fluid communication with the condenser and operable to inject the condensed part of the at least part of the flow of water vapor into the combustor.

There is disclosed a method of recovering and using the water vapor generated by combustion of hydrogen in an aircraft engine. The method includes collecting the water vapor. The method includes cooling the water vapor to generate liquid water and/or cooler water vapor. The method includes using the liquid water and/or cooler water vapor for one or more of the following purposes: 1) to suppress accidental flame and detonation due to a leak of the hydrogen; 2) to provide a heat source to evaporate the liquid hydrogen into gaseous hydrogen; and 3) to provide a water source for nitrogen oxide (NOx) suppression in the combustor.

DESCRIPTION OF THE DRAWINGS

Reference is now made to the accompanying FIGURES in which:

FIG. 1 is a schematic cross sectional view of an aircraft engine with a hydrogen fuel system and a water recovery system.

DETAILED DESCRIPTION

FIG. 1 illustrates an aircraft engine 10 of a type preferably provided for use in subsonic flight, generally comprising in serial flow communication an inlet 12 through which air is drawn into the aircraft engine 10, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 is configured drive a rotatable load, which is a gearbox 13 and propeller 15 in the configuration of the aircraft engine 10 shown in FIG. 1, but which may also be other rotatable loads (e.g. a fan). The compressor and turbine sections 14, 16 rotate about a longitudinal center axis 11 of the aircraft engine 10.

The combustion gases generated by the combustor 16 flow through ducts. Referring to FIG. 1, the combustion gases generated flow from the combustor 16 through a duct of the turbine section 18, and exit the aircraft engine 10 via an exhaust duct 17 downstream of the turbine section 18, relative to the flow direction of the combustion gases. The exhaust duct 17 is defined by radially inner and outer casing or shroud segments which are concentric about the center axis 11. The volume delimited by the exhaust duct 17 has an annular shape about the center axis 11. The combustion gases flow through the exhaust duct 17 before leaving the aircraft engine 10. In another possible configuration of the aircraft engine 10, the rotatable load driven by the turbine section 18 is a fan, and the aircraft engine 10 has a bypass duct 19. The bypass duct 19 is shown schematically in FIG. 1, and receives part of the bypass air or airflow compressed by the fan in order to divert the airflow around the core of the aircraft engine 10. The volume delimited by the bypass duct 19 has an annular shape about the center axis 11.

The fuel which is combusted in the combustor 16 of the aircraft engine 10 is hydrogen H2. The hydrogen H2 combusted in the combustor 16 is in gaseous form (sometimes referred to herein as "gaseous hydrogen GH2"). The hot combustion gases generated by the combustor 16 when the gaseous hydrogen GH2 is mixed with air and combusted are therefore almost entirely water vapor WV. The water vapor WV generated by the combustor 16 is completely in gaseous form. The expression "almost entirely water vapor" refers to the combustion gases being close to 100% water vapor WV by composition or mass of the combustion gases other than the nitrogen in air. It is understood that there may be trace amounts of other gases in the combustion gases. For example, nitrogen at high temperatures reacts with oxygen to form small amount of nitrogen oxides (NOx). Stated differently, the water vapor WV is the main product of combustion of the hydrogen H2 and oxygen O2 in air, and the combustion gases may contain by-products of combustion in very small amounts. The water vapor WV exits the combustor 16 as a flow of water vapor. The combustion disclosed herein of the hydrogen H2 is in contrast to the combustion of conventional hydrocarbon fuels, such as jet fuel, whose main combustion products are in majority carbon dioxide (CO2), small quantity of water vapor and nitrogen in the consumed amount of air.

The aircraft engine 10 includes a hydrogen fuel system 20 that stores the gaseous hydrogen GH2, and which supplies the gaseous hydrogen GH2 to the combustor 16 to be combusted. The hydrogen fuel system 20 may include any number of suitable components to achieve this functionality. For example, and referring to FIG. 1, the hydrogen fuel system 20 includes a gaseous hydrogen accumulator 22. The accumulator 22 is any suitable body or reservoir which defines an internal volume that stores and contains the gaseous hydrogen GH2. In an embodiment, the accumulator 22 is a temperature-controlled pressure vessel which stores the H2 in its gaseous form GH2 under high pressure and very low temperature. The hydrogen fuel system 20 has one or more fuel lines 24. The fuel lines 24 operate to carry or convey the hydrogen H2 to a destination. For example, the fuel lines 24 include one or more fuel supply lines 24I which are in fluid communication with the accumulator 22, in order to convey the hydrogen H2 from an upstream component to the accumulator 22, such that the accumulator 22 can be supplied with the gaseous hydrogen GH2 prior to, or during, operation of the aircraft engine 10. The fuel supply lines 24I may also extend from a hydrogen fuel source 21 that may be internal or external to the aircraft engine 10, to a component of the hydrogen fuel source 21 to convey liquid hydrogen LH2 to the downstream component. The fuel lines 24 include one or more fuel outlet lines 24O which are in fluid communication with both the accumulator 22 and a fuel control unit 23, which schedules and meters the amount of gaseous hydrogen GH2 to the combustor 16. The fuel outlet lines 24O extend from the accumulator 22 through the fuel control unit 23 to the combustor 16, so that the gaseous hydrogen GH2 can be conveyed or carried by the fuel outlet lines 24O to the combustor 16 to be combusted. Referring to FIG. 1, the hydrogen H2 supplied to the combustor 16 via the fuel outlet lines 24O is in gaseous form, such that gaseous hydrogen GH2 is combusted in the combustor 16. The hydrogen fuel system 20 may also include other components and features including, but not limited to, pumps, tanks or reservoirs, air lines, fuel purge lines, actuators, nozzles, valves, manifolds, fuel schedule unit, fuel meter unit or any other component common to a fluid system.

Referring to FIG. 1, the hydrogen H2 provided by the hydrogen fuel system 20 is the only fuel that is combusted in the combustor 16 in order to generate the energy needed to drive all of the components of the aircraft engine 10. In an alternate embodiment, the hydrogen fuel system 20 is one of the fuel systems of the aircraft engine 10. In this alternate embodiment, the aircraft engine 10 has one or more additional fuel systems which supply a hydrocarbon such as jet fuel to be combusted in the combustor 16 either with, or separately from, the hydrogen H2. This configuration of two fuel supply systems may be arranged as a dual fuel system that can burn one type of fuel during operation of the aircraft engine 10, or can burn both types of fuels staged or concurrently during operation of the aircraft engine 10. In another alternate embodiment, the hydrogen H2 provided by the hydrogen fuel system 20 is the fuel that is combusted in the combustor 16 in order to generate the energy needed to drive some of the components of the aircraft engine 10, and the aircraft engine 10 has one or more additional fuel systems which supply a hydrocarbon such as jet fuel to be combusted in the combustor 16 (or elsewhere) to generate the energy needed to drive other components of the aircraft engine 10. It will thus be appreciated that the hydrogen fuel system 20 disclosed herein may be used as the only source of fuel for the aircraft engine 10, or may be used as one of multiples sources of fuel for the aircraft engine 10 (which is sometimes referred to as a "hybrid" fuel system or as a "dual-fuel" fuel system).

The aircraft engine 10 disclosed herein recuperates and reuses at least some of the water vapor WV generated from the combustion of the hydrogen H2. Referring to FIG. 1, the aircraft engine 10 includes a water recovery system 30. The water recovery system 30 recovers water from the combustion process to be used for the purposes set out in the present disclosure in additional detail below. In an embodiment, the water recovery system 30 is the only component of the aircraft engine 10, or of the aircraft to which the aircraft engine 10 is mounted, which supplies water for the purposes described in detail below. It will be appreciated that the water recovered by the water recovery system 30 may also be used for purposes in addition to those set out below, by the aircraft engine 10 or by the aircraft to which the aircraft engine 10 is mounted. These other purposes include, but are not limited to, the following: humidity control, grey water uses, as cooling medium in heat exchangers, and as drinking water after being suitably treated.

Referring to FIG. 1, the water recovery system 30 includes a water vapor collector 32. The water vapor collector 32 functions to receive or to collect some or all of the exhaust gas in the exhaust duct 17, which consists mainly of water vapor VW and small amounts of high-temperature non-reacted nitrogen, so that it can be processed and used by other components of the water recovery system 30 and as exhaust gas recirculation (EGR) 41 as described in greater detail below. The water vapor collector 32 may thus take any suitable form to achieve this functionality. For example, the water vapor collector 32 may be an annular plenum about the center axis 11 into which the water vapor VW is directed. The water vapor collector 32 may be an assembly of components, and in such an embodiment may include one or more collector lines 32L to divert the collected water vapor WV to other components of the water recovery system 30. Referring to FIG. 1, the water vapor collector 32 is positioned in the exhaust duct 17 downstream of the turbine section 18, relative to the flow direction of combustion gases emanating from the combustor 16. The water vapor collector 32 is positioned in the annular volume delimited by the exhaust duct 17. In this position, the water vapor collector 32 may have access to the highest concentration of water vapor WV. In an alternate embodiment, the water vapor collector 32 is positioned in, or in fluid communication with, the duct of the turbine section 18, for example adjacent to one of the turbine stages of the turbine section 18. In an alternate embodiment, the water vapor collector 32 is positioned downstream of, or in fluid communication with, the combustor 16 and upstream of the turbine section 18, relative to the flow direction of combustion gases emanating from the combustor 16. The water vapor collector 32 may also include other components and features including, but not limited to, compressors, tanks or reservoirs, air lines, actuators, nozzles, valves, manifolds, or any other component common to a fluid system.

Referring to FIG. 1, the water recovery system 30 includes a condenser 34 in fluid communication with an outlet of the water vapor collector 32, such as via the collector lines 32L, to receive the water vapour WV from the water vapor collector 32. The condenser 34 is a heat exchanger which functions to cool some or all of the water vapor WV to produce liquid water LW and/or cooled or cooler water vapor WVC, thereby condensing a significant amount of the water vapour WV. The condenser 34 thus extracts heat from the engine exhaust gas which consists of water vapor WV so that the water vapor WV can undergo a phase change. The water vapor WV is thus cooled by passing through the condenser 34. The change of phase undergone by the water vapor WV may result in the water vapor WV becoming liquid water LW in the condenser 34, in becoming a cooled or cooler water vapor WVC that is at a temperature much lower than the water vapor WV harvested by the water vapor collector 32, or in becoming a mixture of liquid water LW and cooler water vapor WVC. The cooler water vapor WVC may take the form of a mist of water. The condensed liquid water LW and/or cooler water vapor WVC may be stored in a water collector 36 of the water recovery system 30, so that it can be used by the water recovery system 30 as described in greater detail below. After passing through the water collector 36, the lower temperature nitrogen gas N2 may be dumped to the engine overboard via the overboard line 320. Referring to FIG. 1, the water collector 36 is separate from the condenser 34 and in fluid communication with the condenser 34 to receive and store the liquid water LW and/or cooler water vapor WVC. In an alternate embodiment, the water collector 36 is a component or part of the condenser 34. In an embodiment, the condenser 34 and the water vapor collector 32 are part of a sub-assembly of the water recovery system 30. In an embodiment, the functionalities of the condenser 34 and of the water vapor collector 32 are performed by a single component or by a single sub-assembly of the water recovery system 30.

Different cooling media may be used to cool the water vapor WV passing through the condenser 34. For example, and referring to FIG. 1, the condenser 34 is positioned at least partially in, or in fluid communication with, the airflow through the bypass duct 19. The relatively cold ambient air of the airflow of the bypass duct 19 is a cooling medium which cools the water vapor WV passing through the condenser 34, thereby transforming the water vapor WV into the liquid water LW and/or cooler water vapor WVC.

In another possible configuration of cooling media, and referring to FIG. 1, one or more of the fuel inlet lines 241 extends from the hydrogen fuel source 21 to the condenser 34, in order to supply the condenser 34 with cryogenic liquid hydrogen LH2. The cryogenic liquid hydrogen LH2 is thus a cooling medium which cools the water vapor WV passing through the condenser 34, thereby transforming the water vapor WV into the liquid water LW and/or cooler water vapor WVC. In this configuration where the cryogenic liquid hydrogen LH2 is the cooling medium, the condenser 34 functions as a hydrogen evaporator because it converts the liquid hydrogen LH2 used to cool the water vapor WV into gaseous hydrogen GH2, using the heat released from the hot engine exhaust gas transformation and cooling of the water vapor WV into the liquid water LW and/or cooler water vapor WVC. Another one of the fuel supply lines 241 may extend from the condenser 34 to the accumulator 22 to transport the heated gaseous hydrogen GH2 back to the accumulator 22 where it may be stored, or to transport the gaseous hydrogen GH2 for storage in another body. Thus, in this configuration where the cryogenic liquid hydrogen LH2 is the cooling medium, the heat released by exhaust gas and the water vapor WV can become a heat source in a hydrogen-fueled combustion system that is used to heat up and vaporize the cryogenic liquid hydrogen LH2 into gaseous hydrogen GH2. Since significant amounts of heat may be required to vaporize the cryogenic liquid hydrogen LH2 into the gaseous hydrogen GH2 form required for combustion in the combustor 16, it may be beneficial for at least some of this heat to be recuperated from the condenser 34 instead of being otherwise discarded out of the aircraft engine 10. The condenser 34 is thus able to use the heat from the hot combustion gases to vaporize the liquid hydrogen LH2 into the gaseous hydrogen GH2 needed for combustion. Thus, the condenser 34 allows for the use of liquid hydrogen LH2 to cool the water vapor WV, which in turn heats up the liquid hydrogen LH2 into gaseous hydrogen GH2 before it is combusted. The condenser/evaporator 34 is thus capable of providing an alternative, or additional, heat source to evaporate the liquid hydrogen LH2 into gaseous hydrogen GH2. In an embodiment, only the heat recovered in the condenser/evaporator 34 is used to vaporize the liquid hydrogen LH2 into gaseous hydrogen GH2. In the condenser 34, the hot exhaust gas losses its heat energy to the cold liquid hydrogen LH2.

The liquid water LW and/or cooler water vapor WVC recovered from the water vapor WV may be used for multiple purposes, some of which are now described in greater detail below.

One of these purposes includes reducing, suppressing or eliminating the undesired flammability and detonability of the hydrogen H2 in areas and regions of the aircraft engine 10 and/or aircraft body where auto-ignition, unintended flames, combustion and detonation are unwanted. Referring to FIG. 1, the water recovery system 30 includes a flame and detonation mitigation system 38 (sometimes referred to herein simply as "detonation mitigation system 38"). The detonation mitigation system 38 is an assembly of cooperating components which functions to reduce or suppress the risk of the hydrogen H2 auto-ignition, flame, combustion, detonating or exploding in parts of the aircraft engine 10 where it is not intended to. The detonation mitigation system 38 may include any component and feature, including but not limited to, pumps, lines, tanks or reservoirs, air lines, fuel lines, electrical wirings, actuators, valves, manifolds, or any other component common to a fluid system. Referring to FIG. 1, one of the components of the detonation mitigation system 38 is one or more spray nozzles 38N having inlets which are in fluid communication with the condenser 34 and/or the water collector 36, such as via an outlet line 34A. The spray nozzles 38N (sometimes referred to herein simply as the "nozzles 38N") can be hydraulically, mechanically or electrically controlled and activated, and each nozzle 38N can be sized to spray a different volume flow rate of the liquid water LW and/or cooler water vapor WVC.

These nozzle 38N receive, or are provided with, the liquid water LW and/or cooler water vapor WVC, through a water supply system, which may include water and water vapor supply components, including but not limited to, water pump, scheduling controller, metering valves, or any other component common to a water and water vapor supply system, so that the nozzles 38N can spray the liquid water LW and/or cooler water vapor WVC on components of the aircraft engine 10 which may present a risk of hydrogen H2 flammability and detonability. For example, and referring to FIG. 1, the nozzles 38N are configured to spray one or more components of the aircraft engine 10 that are outside of the combustor 16. For example, and referring to FIG. 1, the nozzles 38N are configured to spray one or more components of the hydrogen fuel system 20. Referring to FIG. 1, the nozzles 38N are configured to spray one or more of the fuel lines 24 with the liquid water LW and/or cooler water vapor WVC in order to suppress the flammability and detonability of the hydrogen H2 carried in the sprayed fuel lines 24. The liquid water LW and/or cooler water vapor WVC may be sprayed by the nozzles 38N on the outside of the fuel lines 24 to suppress any leak of the hydrogen H2 or to suppress or reduce the ability of the hydrogen H2 to detonate within or outside the fuel lines 24. The water recovery system 30 may have a pump, or may use a pump of the aircraft engine 10, in order to pressurize the liquid water LW and/or cooler water vapor WVC so that it can be sprayed by the hydraulically, mechanically or electrically controlled and activated nozzles 38N.

Other components of the aircraft engine 10 may also be sprayed with the liquid water LW and/or cooler water vapor WVC by the nozzles 38N of the detonation mitigation system 38. For example, and referring to FIG. 1, the nozzles 38N can spray the accumulator 22 and/or one or more compartments 26 of the hydrogen fuel system 20 with the liquid water LW and/or cooler water vapor WVC. The compartments 26 may be any partially or fully enclosed volumes of the hydrogen fuel system 20, for example defined by a casing of the aircraft engine 10, into which the hydrogen H2 may leak. Thus, the detonation mitigation system 38 allows for liquid water LW and/or cooler water vapor WVC to be sprayed in confined spaces and compartments 26 which have, or are exposed to, hydrogen fuel components. These may include, for example, the fuel lines 24, carrying parts, and the outside and inner space between the double-layer or double-walled hydrogen fuel lines 24. The nozzles 38N may also be used to spray components outside of the core of the aircraft engine 10. For example, and referring to FIG. 1, a bypass duct fuel line 24BD is one of the fuel lines 24 which conveys the gaseous hydrogen GH2 to and/or from the accumulator 22, or to/from another component described herein such as the condenser 34. The bypass duct fuel line 24BD is exposed to the airflow in the bypass duct 19, either because the bypass duct fuel line 24BD is positioned in the bypass duct 19 or is in fluid communication with the airflow therein. The nozzles 38N can be used to spray the bypass duct fuel line 24BD with the liquid water LW and/or cooler water vapor WVC to suppress or reduce the flammability and detonability of the hydrogen H2 therein. The nozzles 38N can be used to spray the liquid hydrogen LH2 fuel line 24l which conveys the liquid hydrogen LH2 from the hydrogen fuel source 21 to the condenser/evaporator 34. The flame and detonation mitigation system 38 may thus be used to reduce or suppress flame and detonation risk outside of the core of the aircraft engine 10, in areas or spaces which are exposed to ambient or bypass airflow. These areas, which may not be airtight, may be continuously flushed with airflow while simultaneously being fed with the liquid water LW and/or cooler water vapor WVC by the detonation mitigation system 38. It will be appreciated that any undesirable or excess accumulation of water provided by the nozzles 38N may be drained.

The detonation mitigation system 38 thus allows for the liquid water LW and/or cooler water vapor WVC to be sprayed, via the nozzles 38N, in confined spaces and compartments which have, or are exposed to, hydrogen H2 fuel components in order to impede or suppress the flammability and detonability of the hydrogen H2 in these places. The sprayed liquid water LW and/or cooler water vapor WVC may thus reduce or suppress the flammability and detonation limits of hydrogen H2, and thus serve as an effective hydrogen safety measure which allows for the use of hydrogen H2 as the sole or primary fuel source for the aircraft engine 10. Thus, the aircraft engine 10 disclosed herein allows for the use of the water vapor in the exhaust gases from the combustion of hydrogen H2 to reduce or suppress the flammability limits and the detonability limits of the hydrogen H2 in areas of the aircraft engine 10 where hydrogen H2 flames and detonations are not desirable or intended.

Since the water vapor WV is abundant in the combustion products of the hydrogen-fueled aircraft engine 10, the water recovery system 30 allows for its recuperation so that it can be used for, among other purposes, hydrogen safety measures by reducing or suppressing the flammability and detonability limits of the hydrogen H2 in areas outside of the combustor 16. The water recovery system 30 allows for providing these hydrogen safety measures without having to use or carry another diluent, which may contribute to reducing the weight of the aircraft engine 10 and its part count. In contrast to ground-based gas turbine engines which may combust hydrogen and use a ground-supplied water source for hydrogen flame and detonation mitigation, the water recovery system 30 disclosed herein is the water/cooled vapor source for hydrogen flame and detonation mitigation on the aircraft engine 10, and it is airborne with the aircraft engine 10. The water recovery system 30 may thus provided a water source for hydrogen flame and detonation mitigation on the aircraft engine 10, thereby allowing the aircraft engine 10 to avoid the volume and weight penalty inherent to a dedicated diluent supply that might otherwise be required. The aircraft engine 10 disclosed herein may thus help to address some of the challenges associated with combusting hydrogen H2 to generate propulsive thrust in aero engines.

Another of the purposes for which the liquid water LW and/or cooler water vapor WVC recovered from the water vapor WV may be used is suppressing or reducing the production of nitrogen oxide (NOx) in the combustor 16. Referring to FIG. 1, the water recovery system 30 includes water injectors 39. The water injectors 39 are nozzles or other fluid-injection devices which are in fluid communication with the condenser 34 and/or the water collector 36, such as via the outlet line 34A. The water injectors 39 receive the liquid water LW and/or cooler water vapor WVC from the condenser 34 and/or the water collector 36, then through a water supply system, which may include water and water vapor supply components, including but not limited to, water pump, scheduling controller, metering valves, or any other component common to a water and water vapor supply system, and spray or inject the liquid water LW and/or cooler water vapor WVC into the chamber of the combustor 16. The collected liquid water LW and/or cooler water vapor WVC may thus be injected into the combustor 16, in any desired amount, to manage the heat rise and control the peak combustion temperature in the combustor 16 in order to prevent or minimize the formation of NOx, and its emission by the aircraft engine 10. The introduction of the liquid water LW and/or cooler water vapor WVC into the combustor 16 to reduce NOx generation may lower the combustor flame temperature, and thus have an impact on the performance or efficiency of the aircraft engine 10. However, this may be an acceptable compromise and tradeoff which may be desirable or necessary to meet regulatory requirements, or to satisfy commitments made to customers of the aircraft engine 10.

Another of the purposes for which the liquid water LW and/or cooler water vapor WVC recovered from the water vapor WV may be used is to direct all or part of the remaining exhaust gas back to the combustor 16, which is commonly referred to as "Exhaust Gas Recirculation" or "EGR", through the lower-temperature EGR line 28. This remaining exhaust gas is mainly the nitrogen in the air that passed through the aircraft engine 10, and the remaining water vapor that has not been condensed by the condenser 34 and/or extracted by the detonation mitigation system 38. A customer predetermined or an optimized amount of the recirculating exhaust gas may be injected into the dome region of the combustor 16 by one or more EGR injectors 41. The exhaust gas recirculation of mainly lower temperature nitrogen and remaining amount of water vapor may dilute oxygen content inside the combustor 16 and lower the H2-air mixture temperature, which may collectively reduce the H2-air reaction rate and the combustion rate. This may lead to lower combustor flowfield peak temperature and subsequently lower the NOx emissions.

Referring to FIG. 1, there is disclosed a method of recovering and using the water vapor VW generated by combustion of the hydrogen H2 in the combustor 16 of the aircraft engine 10. The method includes collecting the water vapor WV, such as with the water vapor collector 32. The method includes cooling the water vapor WP to generate the liquid water LW and/or cooler water vapor WVC, such as with the condenser 34. The method includes using the liquid water LW and/or cooler water vapor WVC for one or more of the following purposes: 1) to suppress accidental flame and detonation due to a leak of the hydrogen H2 (such as with the detonation mitigation system 38), 2) to provide an alternative heat source to evaporate the liquid hydrogen LH2 into gaseous hydrogen GH2 (such as with the condenser/evaporator 34), and 3) to provide a water source for NOx suppression in the combustor 16 (such as with the water injectors 39).

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, although the water recovery system 30 is shown in FIG. 1 as part of a turboprop aircraft engine 10, the water recovery system 30 disclosed herein may also be used for other types of aircraft engines 10, such as turbofans and turboshafts. For example, although the detonation mitigation system 38, heat recovery in the condenser/evaporator 34 to vaporize the liquid hydrogen LH2, and suppression of NOx in the combustion of gaseous hydrogen GH2 inside the combustor 16 are described separately above, these systems and functionalities may be present in any combination in the aircraft engine 10. Yet further modifications could be implemented by a person of ordinary skill in the art in view of the present disclosure, which modifications would be within the scope of the present technology.

The invention claimed is:

1. An aircraft engine, comprising:
   a hydrogen fuel system including an accumulator of hydrogen, and one or more fuel lines in fluid communication with the accumulator and configured to carry the hydrogen, the one or more fuel lines including a bypass duct fuel line;
   a combustor in fluid communication with the one or more fuel lines to receive the hydrogen from the accumulator, the combustor operable to combust the hydrogen and produce a flow of water vapor;
   a turbine section downstream of the combustor for extracting energy from the flow of water vapor;
   a water vapor collector positioned downstream of the turbine section to receive at least part of the flow of water vapor when the aircraft engine is operating;
   a condenser in fluid communication with the water vapor collector, the condenser operable to receive and cool in the condenser the at least part of the flow of water vapor and thereby condense at least part of the at least part of the flow of water vapor; and
   a spray nozzle in fluid communication with the condenser and operable to spray the condensed part of the at least part of the flow of water vapor onto a plurality of components of the aircraft engine, wherein the plurality of components includes the bypass duct fuel line.

2. The aircraft engine of claim 1, wherein the plurality of components further includes the accumulator and a compartment of the hydrogen fuel system.

3. The aircraft engine of claim 1, comprising a bypass duct for conveying a bypass air, the bypass duct fuel line being exposed to the bypass air.

4. The aircraft engine of claim 1, wherein the condenser is a hydrogen evaporator, the hydrogen evaporator in fluid communication with the one or more fuel lines to receive a liquid hydrogen from a hydrogen fuel source, and to convert the liquid hydrogen to gaseous hydrogen with heat released from condensation of the condensed part of the at least part of the flow of water vapor.

5. The aircraft engine of claim 1, comprising water injectors in fluid communication with the condenser and operable to inject the condensed part of the at least part of the flow of water vapor into the combustor.

6. The aircraft engine of claim 1, comprising an exhaust duct operable to convey the flow of water vapor, the water vapor collector positioned in the exhaust duct.

7. A water recovery system for an aircraft engine having a combustor supplied by a hydrogen fuel system and configured to combust hydrogen and generate a flow of water vapor, the water recovery system comprising:
   a water vapor collector for receiving at least part of the flow of water vapor;
   a condenser in fluid communication with the water vapor collector, the condenser operable to receive and cool in the condenser the at least part of the water vapor and thereby condense at least part of the at least part of the flow of water vapor; and
   a spray nozzle in fluid communication with the condenser and operable to spray the condensed part of the at least part of the flow of water vapor onto a bypass fuel line of the hydrogen fuel system.

8. The water recovery system of claim 7, wherein the condenser is a hydrogen evaporator configured to receive a liquid hydrogen and to convert the liquid hydrogen to gaseous hydrogen with heat released from condensation of the condensed part of the at least part of the flow of water vapor.

9. The water recovery system of claim 7, comprising water injectors in fluid communication with the condenser and operable to inject the condensed part of the at least part of the flow of water vapor into the combustor.

10. The water recovery system of claim 7, comprising a water collector in fluid communication with the condenser to receive the condensed part of the at least part of the flow of water vapor.

11. An aircraft engine, comprising:
a hydrogen fuel system including an accumulator of hydrogen, and one or more fuel lines in fluid communication with the accumulator and configured to carry the hydrogen, the one or more fuel lines including a bypass duct fuel line;
a combustor in fluid communication with the one or more fuel lines to receive the hydrogen from the accumulator, the combustor operable to combust the hydrogen and generate a flow of water vapor;
a water vapor collector positioned downstream of a turbine section to receive at least part of the flow of water vapor when the aircraft engine is operating;
a condenser in fluid communication with an outlet of the water vapor collector, the condenser operable to receive and cool in the condenser the at least part of the flow of water vapor and thereby condense at least part of the at least part of the flow of water vapor; and
a spray nozzle in fluid communication with an outlet of the condenser and operable to spray the condensed part of the at least part of the flow of water vapor onto a component of the aircraft engine, the spray nozzle operable to spray the condensed part of the at least part of the flow of water vapor onto the bypass duct fuel line;

and one or more of the following:
the condenser in fluid communication with the one or more fuel lines to receive a liquid hydrogen from a hydrogen fuel source, and to convert the liquid hydrogen to gaseous hydrogen with heat released from condensation of the condensed part of the at least part of the flow of water vapor; and
a plurality of water injectors in fluid communication with the condenser and operable to inject the condensed part of the at least part of the flow of water vapor into the combustor.

12. The aircraft engine of claim 11, wherein the component is a plurality of components including the accumulator and a compartment of the hydrogen fuel system.

13. The aircraft engine of claim 11, comprising a bypass duct for conveying a bypass air, the bypass duct fuel line being exposed to the bypass air.

14. The aircraft engine of claim 11, comprising a water collector in fluid communication with the condenser to receive the condensed part of the at least part of the flow of water vapor.

15. The aircraft engine of claim 11, comprising an exhaust gas recirculation in fluid communication with the condenser and in fluid communication with the combustor, the exhaust gas recirculation operable to inject unused exhaust gas into the combustor.

16. The aircraft engine of claim 11, comprising one or more of the following:
the condenser; and
the water injectors.

17. The aircraft engine of claim 11, comprising all of the following:
the condenser; and
the water injectors.

* * * * *